United States Patent
Omori et al.

(10) Patent No.: US 11,292,270 B2
(45) Date of Patent: Apr. 5, 2022

(54) INFORMATION PROCESSING DEVICE FOR CALCULATING A PENETRATION DEGREE AND COMPUTER READABLE MEDIUM FOR THE SAME

(71) Applicant: FUJIFILM Business Innovation Corp., Tokyo (JP)

(72) Inventors: Masao Omori, Kanagawa (JP); Eizo Kurihara, Ebina (JP); Ryosuke Takahashi, Kanagawa (JP); Kenji Akahane, Kanagawa (JP); Yasuhiro Otsuka, Yokohama (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 13 days.

(21) Appl. No.: 16/929,341

(22) Filed: Jul. 15, 2020

(65) Prior Publication Data

US 2021/0276343 A1    Sep. 9, 2021

(30) Foreign Application Priority Data

Mar. 3, 2020   (JP) .............................. JP2020-036288

(51) Int. Cl.
   *B41J 11/00*   (2006.01)
(52) U.S. Cl.
   CPC ............ *B41J 11/002* (2013.01); *B41J 11/009* (2013.01); *B41J 11/0095* (2013.01)

(58) Field of Classification Search
   CPC ..... B41J 11/002; B41J 11/0095; B41J 11/009; H04N 1/00724; H04N 1/00726; H04N 1/00092
   See application file for complete search history.

(56) References Cited

U.S. PATENT DOCUMENTS

2021/0281688 A1*   9/2021   Omori ............... H04N 1/00068

FOREIGN PATENT DOCUMENTS

| JP | 2003-329629 | 11/2003 | |
|---|---|---|---|
| JP | 2003329629 | * 11/2003 | ............ G01N 27/04 |
| JP | 2005-305826 | 11/2005 | |
| JP | 2005305826 | * 11/2005 | ................ B41J 2/01 |
| JP | 2014-224777 | 12/2014 | |

OTHER PUBLICATIONS

English language machine translation of JP 2014-224777.
English language machine translation of JP 2003-329629.
English language machine translation of JP 2005-305826.

* cited by examiner

*Primary Examiner* — Henok D Legesse
(74) *Attorney, Agent, or Firm* — Fildes & Outland, P.C.

(57) ABSTRACT

An information processing device includes a processor configured to acquire a first characteristic value indicating a shape characteristic of a surface of a medium, and calculate, based on the first characteristic value, a penetration degree of a droplet into the medium.

10 Claims, 11 Drawing Sheets

INFORMATION PROCESSING DEVICE FOR CALCULATING A PENETRATION DEGREE AND COMPUTER READABLE MEDIUM FOR THE SAME

CROSS-REFERENCE TO RELATED APPLICATIONS

This application is based on and claims priority under 35 USC 119 from Japanese Patent Application No. 2020-36288 filed on Mar. 3, 2020.

BACKGROUND

Technical Field

The present invention relates to an information processing device and a computer readable medium.

Related Art

JP-A-2014-224777 discloses a liquid penetration absorption determination method. The liquid penetration absorption determination method in JP-A-2014-224777 includes: a step of dropping or applying a liquid on a paper substrate; a step of irradiating, with a laser light, a position where the liquid is dropped or applied; a step of capturing for a plurality of times over time, as a speckle pattern, a laser interference light reflected from the position where the liquid is dropped or applied, to obtain a plurality of pieces of image data; a step of calculating a correlation coefficient based on the plurality of pieces of image data; and a step of determining that the liquid has penetrated into the paper substrate when the correlation coefficient indicates a minimum value.

JP-A-2003-329629 discloses a material determination method. The material determination method in JP-A-2003-329629 includes: a step of attaching a liquid to an object to be detected; a step of measuring, by using a sensor, a degree of penetration of a liquid into the object to be detected; and a step of determining the material of the object to be detected, based on the measurement result of the sensor. The sensor measures both a planar spread and/or a penetration depth of the liquid.

JP-A-2005-305826 discloses an inkjet printing device. The inkjet printing device in JP-A-2005-305826 includes a conveying unit configured to convey a printing sheet and an inkjet unit configured to perform printing by ejecting ink onto the printing sheet. The inkjet printing device in JP-A-2005-305826 further includes an ink passability detection unit configured to detect ink passability of the printing sheet, and a control unit configured to control an ink ejection mode of the inkjet unit according to the detection result of the ink passability detection unit.

SUMMARY

In the case of measuring a penetration degree of a liquid into a printing medium, a method is known in which a droplet is actually dropped on a medium and the result is analyzed using a laser light irradiation device, a laser light source, and a probe (such as an electrical conductivity sensor, a friction sensor, or a gas sensor).

However, since the above laser light irradiation device or the like is large and expensive, it is difficult to easily measure the above penetration degree.

Aspects of non-limiting embodiments of the present disclosure relate to an information processing device and a computer readable medium storing a program which easily calculates a penetration degree of a liquid into a medium as compared with the case of actually dropping a droplet and using a laser light irradiation device or the like.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including a processor. The processor is configured to acquire a first characteristic value indicating a shape characteristic of a surface of a medium, and calculate, based on the first characteristic value, a penetration degree of a droplet into the medium.

BRIEF DESCRIPTION OF DRAWINGS

Exemplary embodiment(s) of the present invention will be described in detail based on the following figures, wherein.

DETAILED DESCRIPTION

Hereinafter, exemplary embodiments of a droplet penetration degree calculation device, which is an example of an information processing device according to the present invention, will be described.

Configuration of Droplet Penetration Degree Calculation Device ESS

Figure 1:
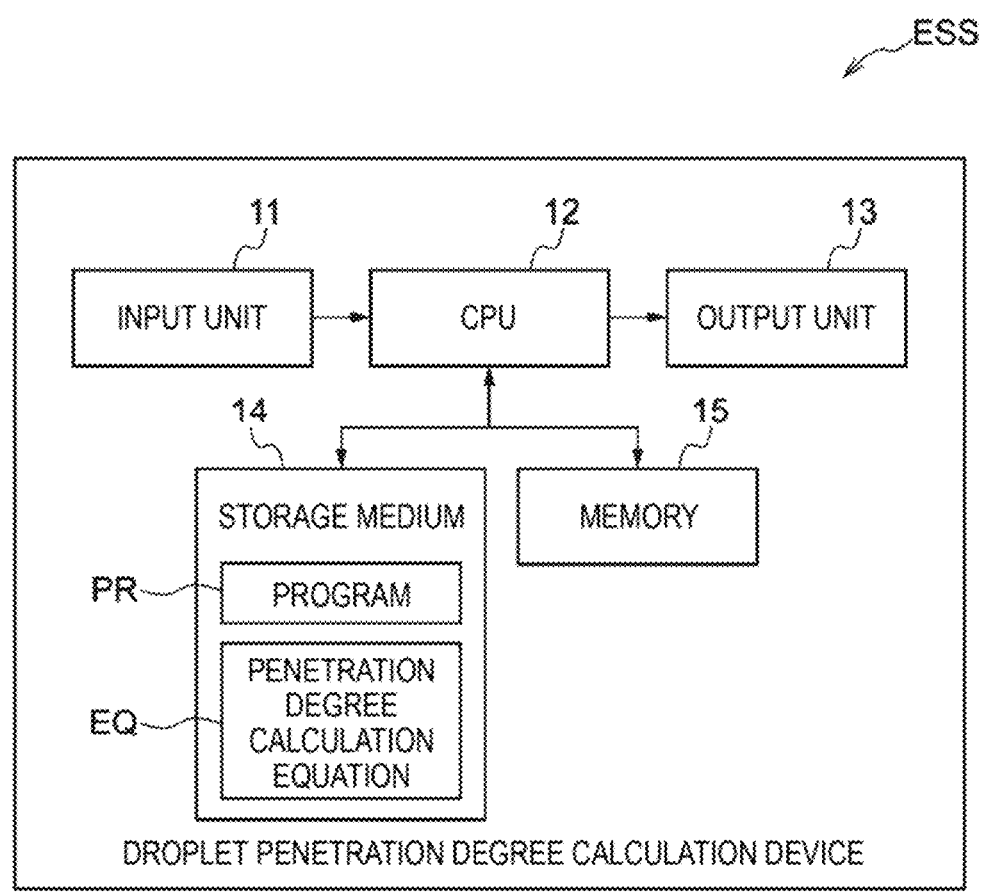
FIG. 1 shows a configuration of a droplet penetration degree calculation device ESS according to an exemplary embodiment.

FIG. 1 shows a configuration of the droplet penetration degree calculation device ESS according to the exemplary embodiment. Hereinafter, the configuration of the droplet penetration degree calculation device ESS according to the exemplary embodiment will be described with reference to FIG. 1.

As shown in FIG. 1, the droplet penetration degree calculation device ESS according to the exemplary embodiment includes an input unit 11, a central processing unit (CPU) 12, an output unit 13, a storage medium 14, and a memory 15.

The input unit 11 includes, for example, a sensor, a photodiode, a keyboard, a mouse, and a touch panel. The CPU 12 is an example of a processor, and is a core of a well-known computer which operates hardware according to software. The output unit 13 includes, for example, a light emitting diode, a printer, a liquid crystal monitor, and a touch panel. The storage medium 14 includes, for example, a hard disk drive (HDD), a solid state drive (SSD), and a read only memory (ROM). The memory 15 includes, for example, a dynamic random access memory (DRAM) and a static random access memory (SRAM).

The storage medium 14 stores a program PR and a penetration degree calculation equation EQ.

The program PR is an instruction group for defining the content of a processing that the CPU 12 should execute.

The penetration degree calculation equation EQ is an equation for calculating the penetration degree (also referred to as "penetration coefficient").

Here, the "penetration degree (penetration coefficient)" refers to a degree of ink droplets or the like penetrating into a printing medium PM (for example, shown in FIG. 5) such as paper sheet, which is an example of a "medium".

The penetration degree (penetration coefficient) STD is calculated according to a following equation (EQ).

Penetration degree STD=A×brightness statistic KT+B× electrical resistance value DT+C×infrared absorption amount SK1/infrared absorption amount SK2+D  (EQ)

The "brightness statistic KT" refers to a state (for example, the number) of pores AN (for example, shown in FIG. 5) which may exist per unit area of a surface of the printing medium PM.

The "brightness statistic KT" is an example of a "first characteristic value" indicating a "shape characteristic" of the surface of the printing medium PM.

The "electrical resistance value DT" (log Ω) is indicated as a common logarithm value of a resistance value per unit length of the surface of the printing medium PM.

The "infrared absorption amount SK1" refers to the amount of infrared lights absorbed by the surface of the printing medium PM when the surface of the printing medium PM is irradiated with an infrared light having a wavelength of 1400 nm.

The "infrared absorption amount SK2" refers to the amount of infrared lights absorbed by the surface of the printing medium PM when the surface of the printing medium PM is irradiated with an infrared light having a wavelength of 1250 nm. Each of the "infrared absorption amount SK1" and "infrared absorption amount SK2" is calculated as a ratio of an actual amount of received light to an amount of received light in a case where the infrared lights irradiated are reflected by 100 percent. The case where the infrared lights irradiated are reflected by 100 percent corresponds to a case where no infrared lights irradiated are absorbed.

The "electrical resistance value DT", the "infrared absorption amount SK1", and the "infrared absorption amount SK2" are examples of a "second characteristic value" indicating a "physical characteristic" of the surface of the printing medium PM.

The reason of using the infrared light having both wavelengths of 1250 nm and 1400 nm is as follows. By using the former wavelength of 1250 nm, the infrared absorption amount may be measured regardless of the material of the printing medium PM. Therefore, the infrared absorption amount obtained by the measurement using the former wavelength of 1250 nm may be used as a reference amount (reference value), and the infrared absorption amount obtained by the measurement using the latter wavelength of 1400 nm may be calibrated.

The "constant A", "constant B", and "constant C" are experimentally obtained constants for conversion, which are used to obtain the penetration degree STD of the printing medium PM, based on the brightness statistic KT, the electrical resistance value DT, and the infrared absorption amounts SK1 and SK2 of the printing medium PM whose penetration degree STD is to be predicted.

The "constant A", "constant B", and "constant C" are, for example, numerical values specified in advance under an environment in which the measurement may be performed with higher accuracy (for example, an environment using a laser microscope), which is different from that of the droplet penetration degree calculation device ESS. More specifically, the "constant A", "constant B", and "constant C" are specified to define the relationship between penetration degrees STD of plural printing media PMs, which are different from the above "printing medium PM whose penetration degree STD is to be predicted" and are experimentally used, and brightness statistic KT, electrical resistance values DT and infrared absorption amounts SK1 and SK2 of the plural printing media PMs.

The "constant D" is a constant for complementing the calculation when the penetration degree STD is calculated using the brightness statistic KT, the electrical resistance value DT, the infrared absorption amounts SK1 and SK2, and the constants A, B, C. Sets of the "constant A", "constant B", "constant C" and "constant D" are prepared in advance for each of the cases where all of the brightness statistic KT, electrical resistance values DT and the infrared absorption amounts SK1 and SK2 are used and where at least one of the brightness statistic KT, electrical resistance value DT and the infrared absorption amounts SK1 and SK2 are not used.

Function of Droplet Penetration Degree Calculation Device ESS

Figure 2:
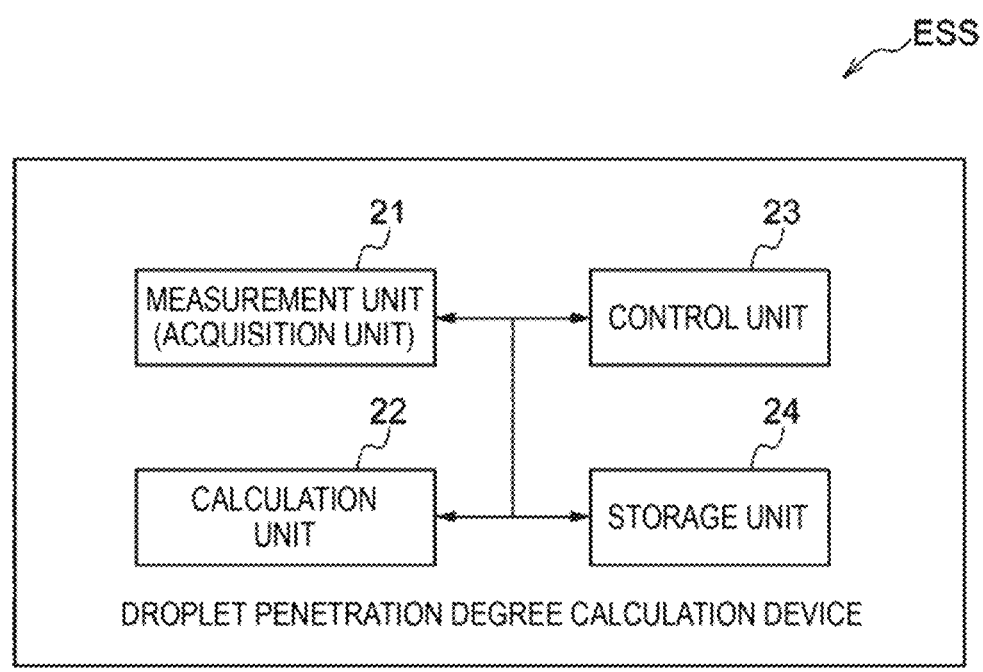
FIG. 2 is a functional block diagram of the droplet penetration degree calculation device ESS according to the exemplary embodiment.

FIG. 2 is a functional block diagram of the droplet penetration degree calculation device ESS according to the exemplary embodiment.

As shown in FIG. 2, the droplet penetration degree calculation device ESS according to the exemplary embodiment includes a measurement unit (acquisition unit) 21, a calculation unit 22, a control unit 23, and a storage unit 24.

Regarding a relationship between a hardware configuration and a functional configuration in the droplet penetration degree calculation device ESS, on the hardware, the CPU 12 executes the program PR stored in the storage medium 14 (implementing some functions of the storage unit 24) while using the memory 15 (implementing some functions of the storage unit 24), and, as the control unit 23, controls the operations of the input unit 11 and the output unit 13, as necessary. Thereby, the functions of each unit of the measurement unit 21 and the calculation unit 22 are implemented. The functions of the units will be described below.

Unit Configuration of Droplet Penetration Degree Calculation Device ESS

Figure 3:
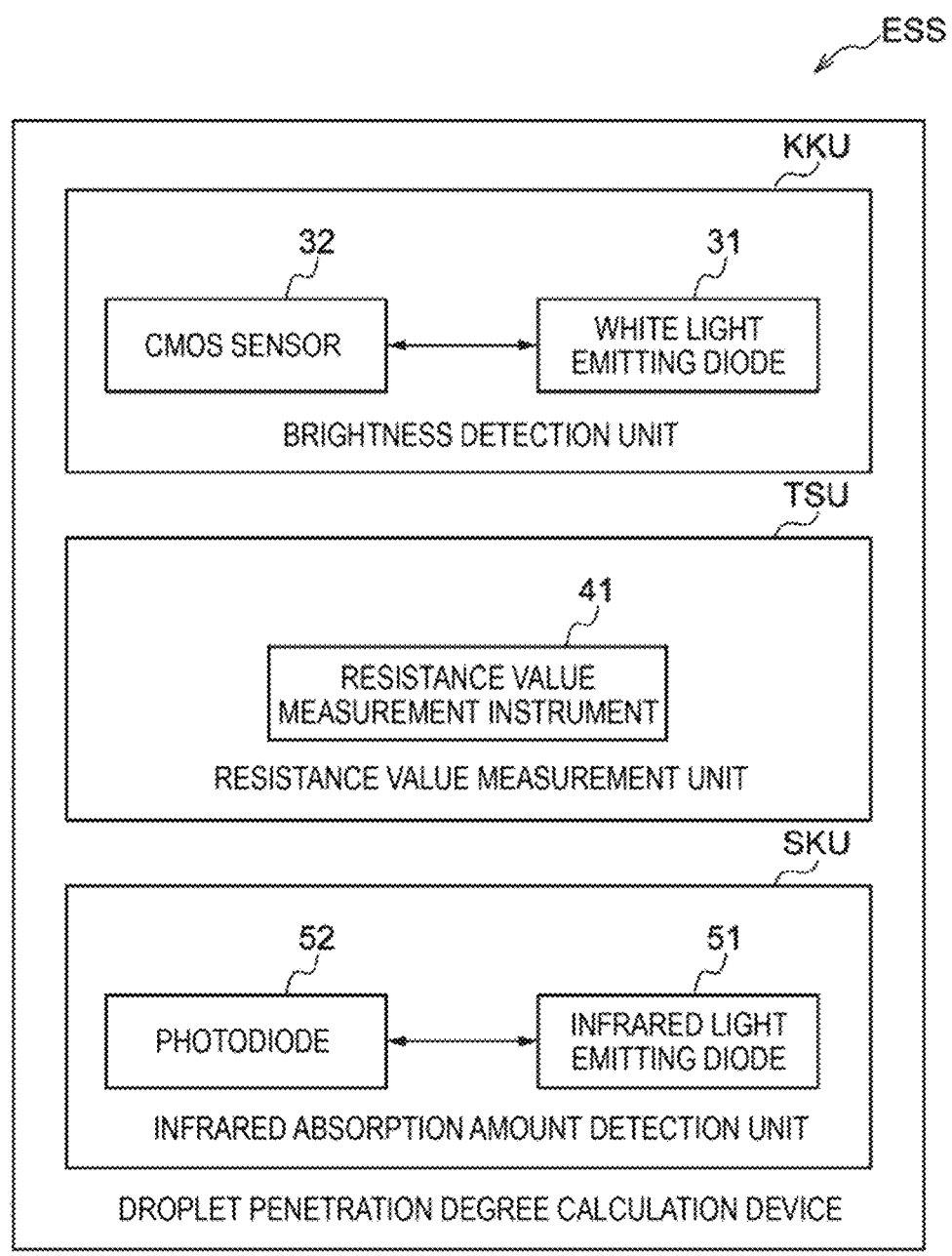
FIG. 3 shows a unit configuration of the droplet penetration degree calculation device ESS according to the exemplary embodiment.

FIG. 3 shows a unit configuration of the droplet penetration degree calculation device ESS according to the exemplary embodiment.

As shown in FIG. 3, the droplet penetration degree calculation device ESS according to the exemplary embodiment includes three units, that is, a brightness detection unit KKU, a resistance value measurement unit TSU, and an infrared absorption amount detection unit SKU.

As shown in FIG. 3, the brightness detection unit KKU includes a white light emitting diode 31 and a CMOS sensor 32. The white light emitting diode 31 corresponds to the output unit 13 (shown in FIG. 1), and the CMOS sensor 32 corresponds to the input unit 11 (shown in FIG. 1).

As shown in FIG. 3, the brightness detection unit KKU includes a resistance value measurement instrument 41. The resistance value measurement instrument 41 corresponds to the input unit 11 and the output unit 13.

As shown in FIG. 3, the infrared absorption amount detection unit SKU includes an infrared light emitting diode 51 and a photodiode 52. The infrared light emitting diode 51 corresponds to the output unit 13, and the photodiode 52 corresponds to the input unit 11.

Figure 4:
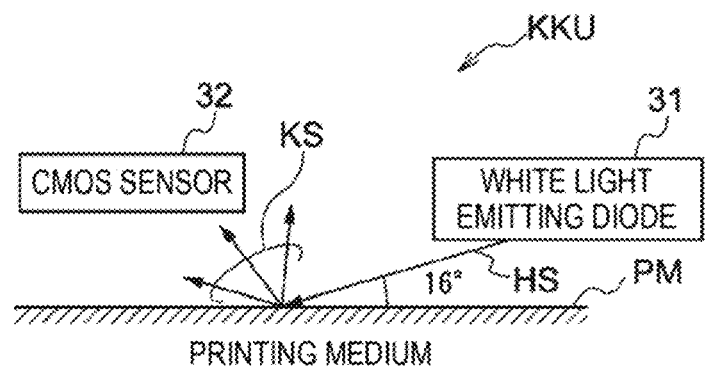
FIG. 4 is a first diagram showing irradiation of a white light HS and imaging of a diffused light KS by using a brightness detection unit KKU according to the exemplary embodiment.

Factual Relationship Assumed by Droplet Penetration Degree Calculation Device ESS According to Exemplary Embodiment FIG. 4 is a first diagram showing irradiation of a white light HS and imaging of a diffused light KS by using the brightness detection unit KKU according to the exemplary embodiment.

Figure 5:
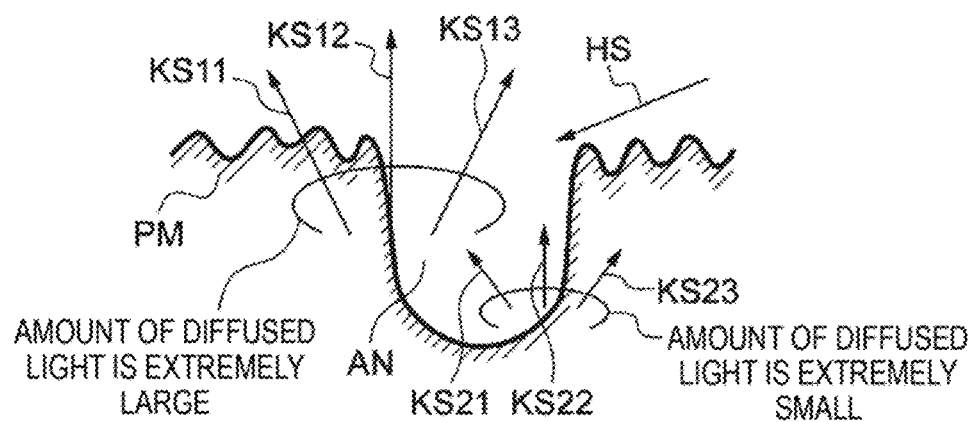
FIG. 5 is a second diagram showing irradiation of the white light HS and imaging of the diffused light KS by using the brightness detection unit KKU according to the exemplary embodiment.

FIG. 5 is a second diagram showing irradiation of the white light HS and imaging of the diffused light KS by using the brightness detection unit KKU according to the exemplary embodiment.

A large number of pores AN (for example, shown in FIG. 5) are present on the surface of the printing medium PM (for example, shown in FIG. 4). A large number of pores AN have a pore diameter of, for example, several μm to several hundreds of μm. Analysis using a laser microscope (not shown) reveals that among the pores AN having a pore diameter of several μm to several hundreds of μm, particularly pores AN of several μm (including, for example, 3 μm or less) to several tens of μm (including, for example, 30 μm) have a correlation relationship with the penetration degree STD.

Therefore, in the droplet penetration degree calculation device ESS according to the exemplary embodiment, in order to calculate the brightness statistic KT to be used in the above penetration degree calculation equation EQ, theoretically, for example, it is desirable to detect a pore AN having a pore diameter of 10 μm or more. Further, to detect the pore AN having a pore diameter of 10 μm or more, for example, the CMOS sensor 32 (shown in FIG. 3) having a resolution of 1 μm to 10 μm is used, and the detection of the pore AN by the CMOS sensor 32 is performed on the surface of the printing medium PM, for example, over a range of a square having an area equal to or larger than a square area of 5 mm in length and width (for example, shown in FIG. 7).

Operation of Droplet Penetration Degree Calculation Device ESS According to Exemplary Embodiment Hereinafter, in order to facilitate the explanation and understanding, it is assumed that the printing medium PM is preset at a position where the brightness statistic KT, the electrical resistance value DT, and the infrared absorption amount SK of the printing medium PM may be measured, that is, a position where measurement and detection may be performed, in relation to the droplet penetration degree calculation device ESS.

Operation of Brightness Detection Unit KKU

Figure 6:
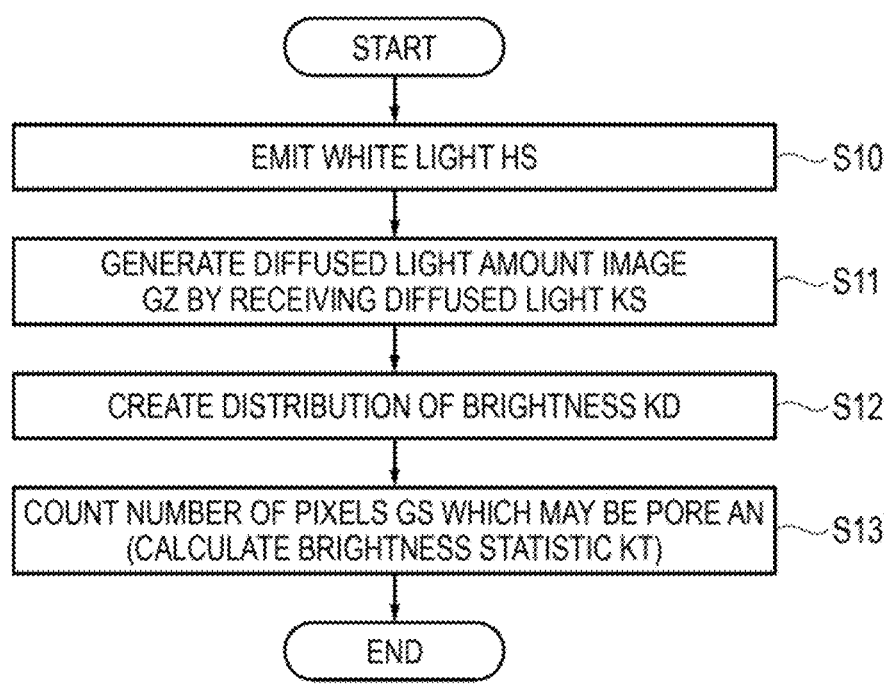
FIG. 6 is a flowchart showing an operation of the brightness detection unit KKU according to the exemplary embodiment.

FIG. 6 is a flowchart showing the operation of the brightness detection unit KKU according to the exemplary embodiment. Hereinafter, the operation of the brightness detection unit KKU according to the exemplary embodiment will be described with reference to FIG. 4 to FIG. 6 showing the operation of the brightness detection unit KKU.

Step S10: a user (not shown) of the droplet penetration degree calculation device ESS presses, for example, a button (not shown) for calculating the brightness statistic KT from the input unit 11 (shown in FIG. 1) of the droplet penetration degree calculation device ESS. In response to the press, in the droplet penetration degree calculation device ESS, the CPU 12 (shown in FIG. 1), as the measurement unit 21 (shown in FIG. 2), starts the operation of the white light emitting diode 31, which is the output unit 13 (shown in FIG. 1). Accordingly, the white light emitting diode 31 emits the white light HS toward the printing medium PM, as shown in FIG. 4.

As shown in FIG. 4, the white light emitting diode 31 of the brightness detection unit KKU preferably irradiates the printing medium PM with the white light HS at about 16 degrees with respect to the printing medium PM. When the white light HS is emitted at an angle of about 16 degrees, as shown in FIG. 5, at an upper end of a side wall of the pore AN on the surface of the printing medium PM, diffused lights KS11, KS12, KS13 having an extremely large amount of diffused light as compared with other diffused lights KS are emitted. On the other hand, at a lower end of the side wall of the pore AN, diffused lights KS21, KS22, and KS23 having an extremely small amount of diffused light as compared with other diffused lights KS are emitted.

Returning to FIG. 6, the description of the operation of the droplet penetration degree calculation device ESS will be continued.

Step S11: when the white light HS is emitted in step S10, in the droplet penetration degree calculation device ESS, the CPU 12, as the measurement unit 21, starts the operation of the CMOS sensor 32, which is the input unit 11 (shown in FIG. 1). Accordingly, the CMOS sensor 32 receives the diffused light KS emitted from the surface of the printing medium PM, that is, the diffused lights KS11 to KS23 (shown in FIG. 5) and other diffused lights KS.

Figure 7:
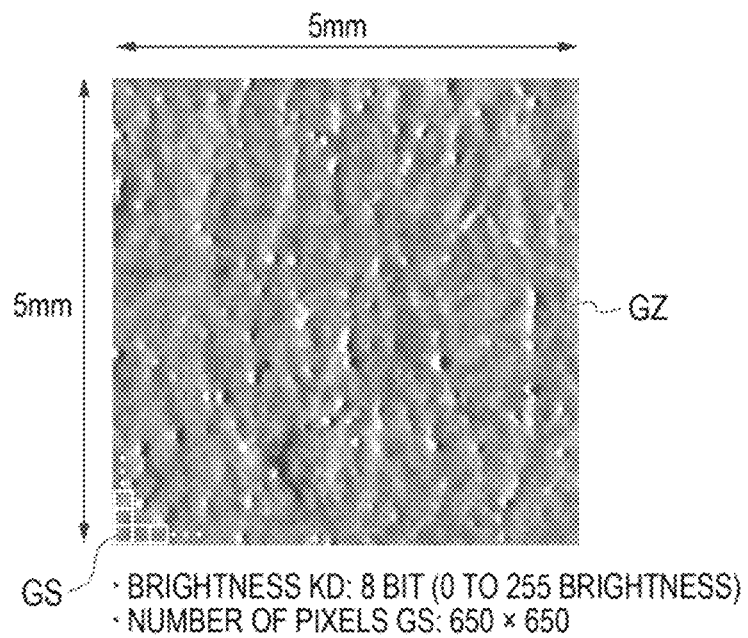
FIG. 7 shows a diffused light amount image GZ according to the exemplary embodiment.

FIG. 7 shows a diffused light amount image GZ according to the exemplary embodiment.

When the CMOS sensor 32 receives the diffused light KS, as shown in FIG. 7, the CPU 12, as the measurement unit 21, generates the diffused light amount image GZ indicating the amount of light diffused on the surface of the printing medium PM, in other words, indicating that the pores AN are present on the surface of the printing medium PM.

As shown in FIG. 7, as the diffused light amount image GZ, for example, a square region of 500 μm in length and width is imaged on the surface of the printing medium PM. As shown in FIG. 7, the diffused light amount image GZ is composed of, for example, 650×650 pixels GS in length and width (a total of approximately 420,000 pixels GS). Each pixel GS indicates the brightness KD of the surface of the printing medium PM, in other words, the intensity of the amount of diffused light KS in 8 bits (256 levels from 0 to 255).

Returning to FIG. 6, the description of the operation of the droplet penetration degree calculation device ESS will be continued.

Step S12: when the diffused light amount image GZ is generated in step S11, the CPU 12, as the measurement unit 21, creates a distribution diagram BPZ showing a distribution of the brightness KD on the surface of the printing medium PM.

Figure 8:
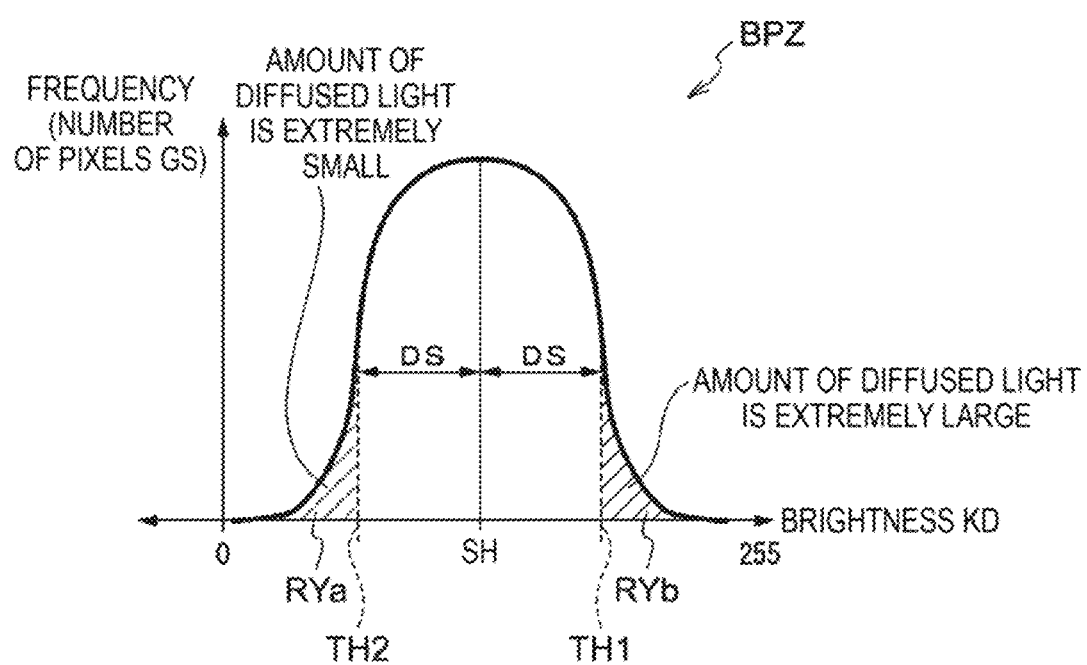
FIG. 8 shows a distribution diagram BPZ according to the exemplary embodiment.

FIG. 8 shows the distribution diagram BPZ according to the exemplary embodiment.

More specifically, as shown in FIG. 8, the CPU 12 creates the distribution diagram BPZ showing a relationship between the plural (about 420,000) pixels GS included in the diffused light amount image GZ (shown in FIG. 7) and the brightness KD shown by each pixel GS. As shown in FIG. 8, the distribution diagram BPZ shows that the relationship between the brightness KD and the frequency (the number of pixels GS) approximates a normal distribution. In addition, as shown in FIG. 8, the distribution diagram BPZ shows that the brightness KD "122" to "123" (about (255−0)/2) is a most frequent brightness value SH.

Returning to FIG. 6, the description of the operation of the droplet penetration degree calculation device ESS will be continued.

Step S13: when the distribution diagram BPZ of the brightness KD is created in step S12, the CPU 12, as the calculation unit 22 (shown in FIG. 2), counts the number of pixels GS which may be the pores AN. Accordingly, the CPU 12 calculates the brightness statistic KT.

Here, "may be pores AN" means that the pixel GS includes two or more pores AN, includes only one pore AN, or includes only a part of one pore AN.

Specifically, the CPU 12 counts the number of pixels GS present at positions separated by a predetermined distance DS or longer from the most frequent brightness value SH on the distribution diagram BPZ (shown in FIG. 8), in other words, counts the number of pixels GS having a brightness KD equal to or greater than a predetermined brightness KD or equal to or smaller than a predetermined brightness KD (an example of a "first threshold value" and an example of "second threshold value", respectively) defined by the distance DS, from around the brightness KD "122" to "123" as the most frequent brightness value SH.

More specifically, the CPU 12 counts the number of pixels GS present on a region RYa where the brightness is equal to or smaller than a threshold value TH2 and which is at a position separated from the most frequent brightness value SH by the brightness KD corresponding to the distance DS in a direction of a smaller brightness KD on the distribution diagram BPZ. In other words, the CPU 12 counts the number of pixels GS indicating the diffused lights KS21, KS22, KS23 (shown in FIG. 5) in which the amount of light diffused is extremely smaller than that of other diffused lights KS, that is, counts the number of pixels GS which may be at the lower end of the side wall of the pore AN on the surface of the printing medium PM.

Similarly, the CPU 12 counts the number of pixels GS present on a region RYb where the brightness is equal to or greater than a threshold value TH1 and which is at a position separated from the most frequent brightness value SH by the brightness KD corresponding to the distance DS in a direction of a larger brightness KD on the distribution diagram BPZ. In other words, the CPU 12 counts the number of pixels GS indicating the diffused lights KS11, KS12, KS13 (shown in FIG. 5) in which the amount of light diffused is extremely greater than that of other diffused lights KS, that is, counts the number of pixels GS which may be at the upper end of the side wall of the pore AN on the surface of the printing medium PM.

The CPU 12 acquires the brightness statistic KT by counting the number of pixels GS in the regions RYa and RYb described above.

Here, the "distance DS" is a numerical value obtained by observing the surface of the printing medium PM as a sample for calculating the distance DS in advance with, for example, a laser microscope (not shown). More specifically, the "distance DS" is a numerical value for approximating a state of the pore AN on the surface of the printing medium PM, which is indicated by the calculated brightness statistic KT, to a state of the pore AN on the surface of the printing medium PM (a state closer to the actual state).

The reason of using the above laser microscope to observe the printing medium PM as a sample is that when the state of the pore AN on the surface of the printing medium PM may be obtained with higher accuracy, the state close to the actual state may be observed.

A combination of plural types and plural brands (manufacturing companies, factories, etc.) of sheet may be used as the sample printing medium PM, to get the distance DS used widely in general, that is, universally.

Operation of Resistance Value Measurement Unit TSU

Figure 9:
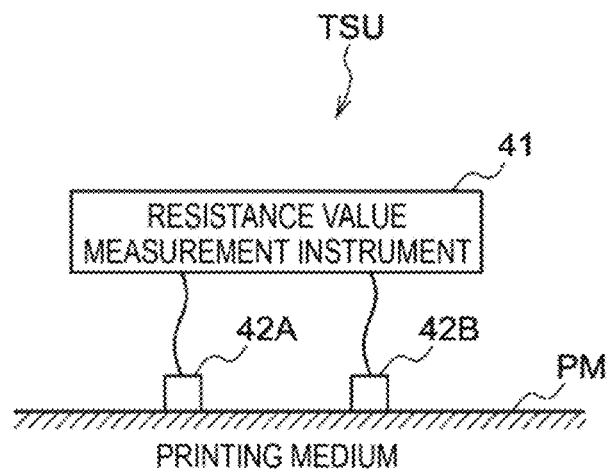
FIG. 9 is a diagram showing measurement of a resistance value by using a resistance value measurement unit TSU according to the exemplary embodiment.

FIG. 9 is a diagram showing measurement of the resistance value by using the resistance value measurement unit TSU according to the exemplary embodiment.

Figure 10:
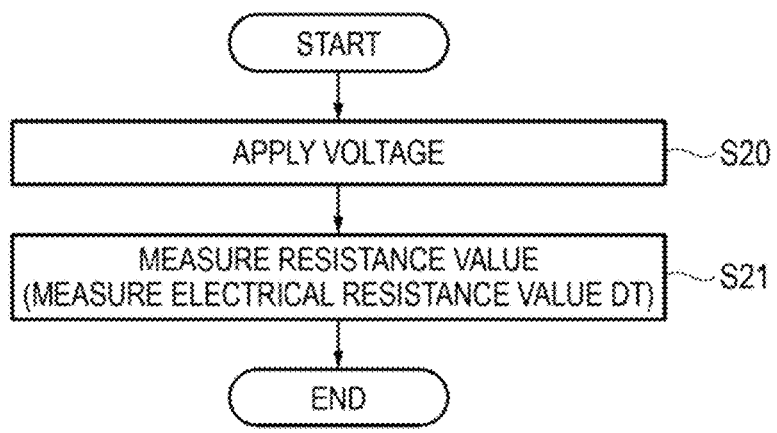
FIG. 10 is a flowchart showing an operation of the resistance value measurement unit TSU according to the exemplary embodiment.

FIG. 10 is a flowchart showing the operation of the resistance value measurement unit TSU according to the exemplary embodiment.

Hereinafter, the operation of the resistance value measurement unit TSU according to the exemplary embodiment will be described with reference to FIG. 9 and FIG. 10 showing the operation of the resistance value measurement unit TSU.

Step S20: the user of the droplet penetration degree calculation device ESS presses, for example, a button (not shown) for calculating the electrical resistance value DT from the input unit 11 (shown in FIG. 1) of the droplet penetration degree calculation device ESS. In response to the press, in the droplet penetration degree calculation device ESS, the CPU 12 (shown in FIG. 1), as the measurement unit 21 (shown in FIG. 2), starts the operation of the resistance value measurement instrument 41, which is the output unit 13 (shown in FIG. 1). Accordingly, the resistance value measurement instrument 41 applies a voltage between two electrodes 42A and 42B on the printing medium PM.

Here, since the electrical resistance value DT of the printing medium PM is extremely large, it is desirable that a distance between the two electrodes 42A and 42B is, for example, about 1 mm, and the applied voltage is about several hundreds of V or more (for example, 200 V).

Step S21: when a voltage is applied between the two electrodes 42A and 42B in step S20, the CPU 12, as the measurement unit 21 (shown in FIG. 2), instructs the resistance value measurement instrument 41 to measure the resistance value of the printing medium PM, that is, the electrical resistance value DT. Accordingly, the resistance value measurement instrument 41 measures the electrical resistance value DT of the printing medium PM.

Operation of Infrared Absorption Amount Detection Unit SKU

Figure 11:
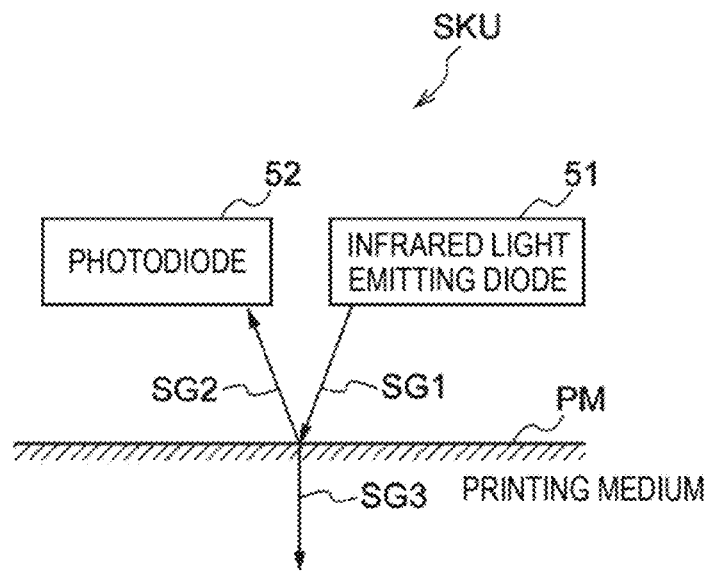
FIG. 11 is a diagram showing measurement of an infrared absorption amount SK by using an infrared absorption amount detection unit SKU according to the exemplary embodiment.

FIG. 11 is a diagram showing measurement of the infrared absorption amount SK by using the infrared absorption amount detection unit SKU according to the exemplary embodiment.

Figure 12:
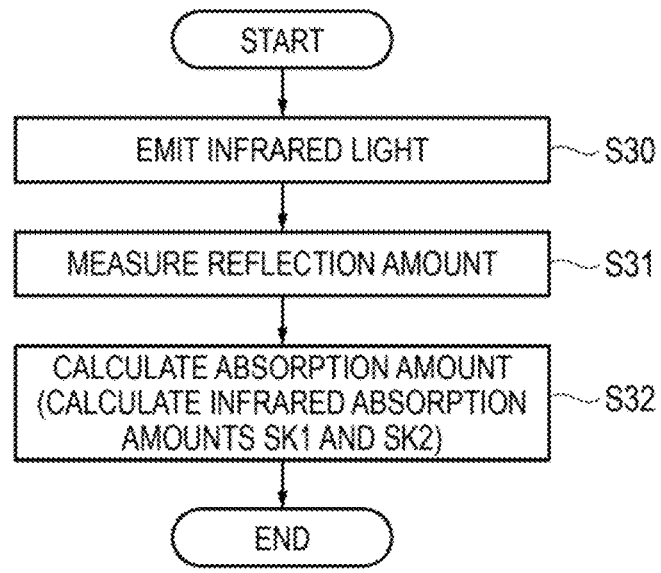
FIG. 12 is a flowchart showing an operation of the infrared absorption amount detection unit SKU according to the exemplary embodiment.

FIG. 12 is a flowchart showing an operation of the infrared absorption amount detection unit SKU according to the exemplary embodiment.

Hereinafter, the operation of the infrared absorption amount detection unit SKU according to the exemplary embodiment will be described with reference to FIG. 11 and FIG. 12 showing the operation of the infrared absorption amount detection unit SKU.

Step S30: the user of the droplet penetration degree calculation device ESS presses, for example, a button (not shown) for calculating the infrared absorption amount SK from the input unit 11 (shown in FIG. 1) of the droplet penetration degree calculation device ESS. In response to the press, in the droplet penetration degree calculation device ESS, the CPU 12 (shown in FIG. 1), as the measurement unit 21 (shown in FIG. 2), starts the operation of the infrared light emitting diode 51, which is the output unit 13 (shown in FIG. 1). Accordingly, the infrared light emitting diode 51 emits an infrared light SG1 toward the surface of the printing medium PM.

Step S31: when the infrared light SG1 is emitted toward the surface of the printing medium PM in step S30, the CPU 12, as the measurement unit 21, instructs the operation of the photodiode 52 which is the input unit 11 (shown in FIG. 1), and, for example, switches a circuit wiring between the CPU 12 and the photodiode 52 such that the detection result of the photodiode 52 is fed back to the CPU 12. Accordingly, the photodiode 52 measures the amount of an infrared light SG2 reflected on the surface of the printing medium PM, that is, an reflection amount.

Step S32: when the reflection amount of the infrared light SG2 is measured in step S31, the CPU 12, as the calculation unit 22 (shown in FIG. 2), subtracts the reflection amount of the infrared light SG2 measured by the photodiode 52 in step S31 from the amount of the infrared light SG1 emitted from the infrared light emitting diode 51 in step S30. Accordingly, the CPU 12 calculates the amount (absorption amount) of an infrared light SG3 absorbed by the surface of the printing medium PM, that is, the infrared absorption amounts SK1 and SK2.

The infrared absorption amount is measured for two sets with the above steps S30 to S32 as one set. In the first set, the above 1400 nm is used as the wavelength of the infrared light SG1. In the second set, the above 1250 nm is used as the wavelength of the infrared light SG2.

Calculation of Penetration Degree STD

Figure 13:
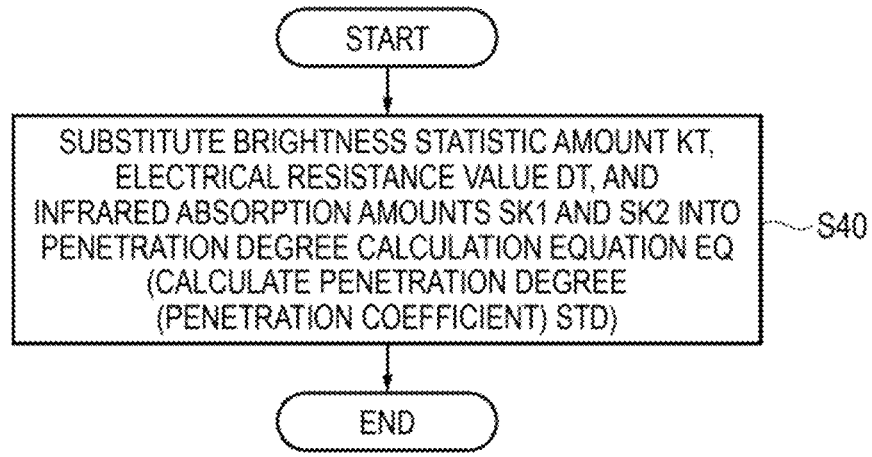
FIG. 13 is a flowchart showing calculation of a penetration degree STD by using the droplet penetration degree calculation device ESS according to the exemplary embodiment.

FIG. 13 is a flowchart showing calculation of the penetration degree STD by using the droplet penetration degree calculation device ESS according to the exemplary embodiment. Hereinafter, the calculation of the penetration degree STD will be described with reference to the flowchart of FIG. 13.

In Step S40, in the droplet penetration degree calculation device ESS, the CPU 12 (shown in FIG. 1), as the calculation unit 22 (shown in FIG. 2), substitutes the brightness statistic KT calculated in step S13, the electrical resistance value DT measured in step S21, and the infrared absorption amounts SK1 and SK2 calculated in step S32 into the penetration degree calculation equation EQ. Accordingly, the penetration degree STD is calculated.

The CPU 12 outputs the calculated penetration degree STD to the output unit 13 (shown in FIG. 2) such as a printer or a liquid crystal monitor, in response to a request from the user of the droplet penetration degree calculation device ESS.

More specifically, the CPU 12 may make the following substitutions.

(1) When only the brightness statistic KT is calculated, only the brightness statistic KT is substituted into the penetration degree calculation equation EQ.

(2) When the brightness statistic KT is calculated and the electrical resistance value DT is measured, the brightness statistic KT and the electrical resistance value DT are substituted into the penetration degree calculation equation EQ.

(3) When the brightness statistic KT and the infrared absorption amounts SK1 and SK2 are calculated, the brightness statistic KT and the infrared absorption amounts SK1 and SK2 are substituted into the penetration degree calculation equation EQ.

(4) When the electrical resistance value DT is measured and the infrared absorption amounts SK1 and SK2 are calculated, the electrical resistance value DT and the infrared absorption amounts SK1 and SK2 are substituted into the penetration degree calculation equation EQ.

Figure 14:
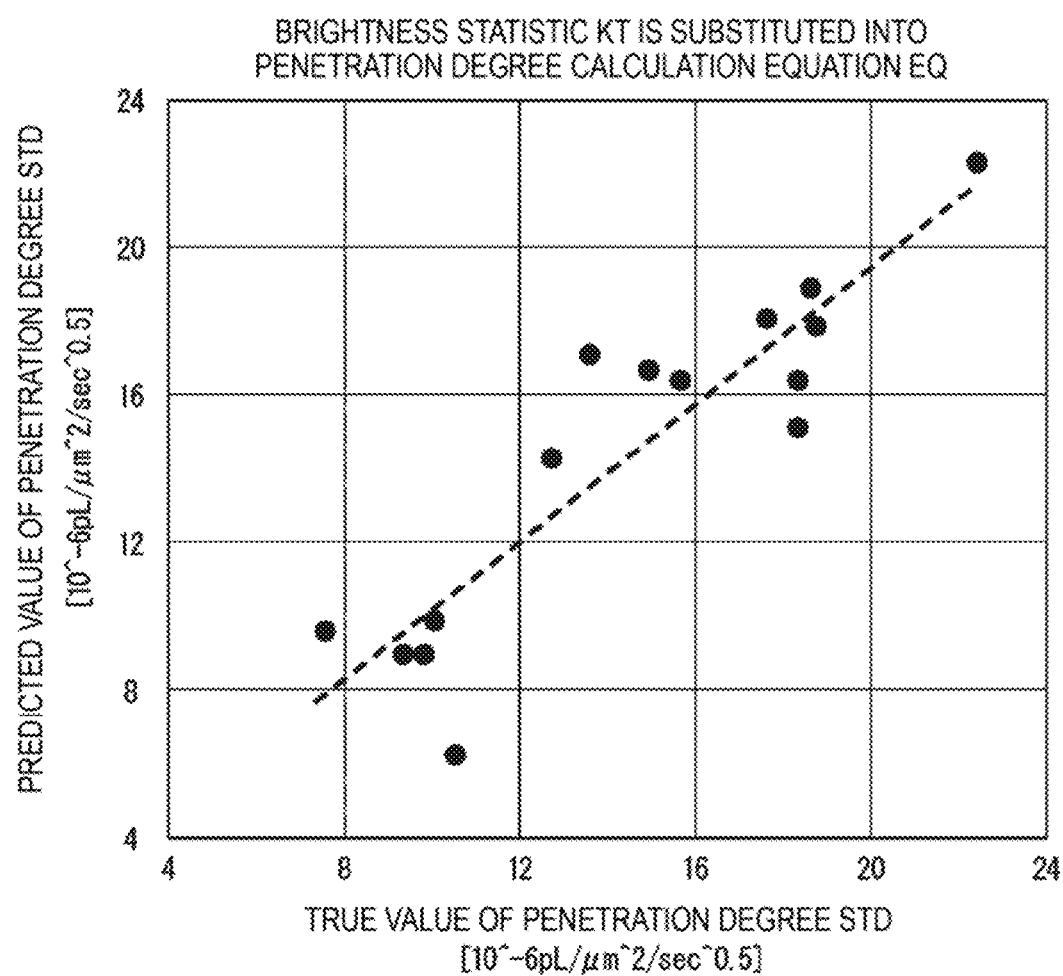
FIG. 14 shows a first relationship between a true value of the penetration degree STD and a predicted value according to the exemplary embodiment.

Comparison Between Predicted Value of Penetration Degree Calculated from Penetration Degree Calculation Equation EQ and True Value of Penetration Degree FIG. 14 shows a first relationship between a predicted value and a true value of the penetration degree STD according to the exemplary embodiment.

Figure 15:
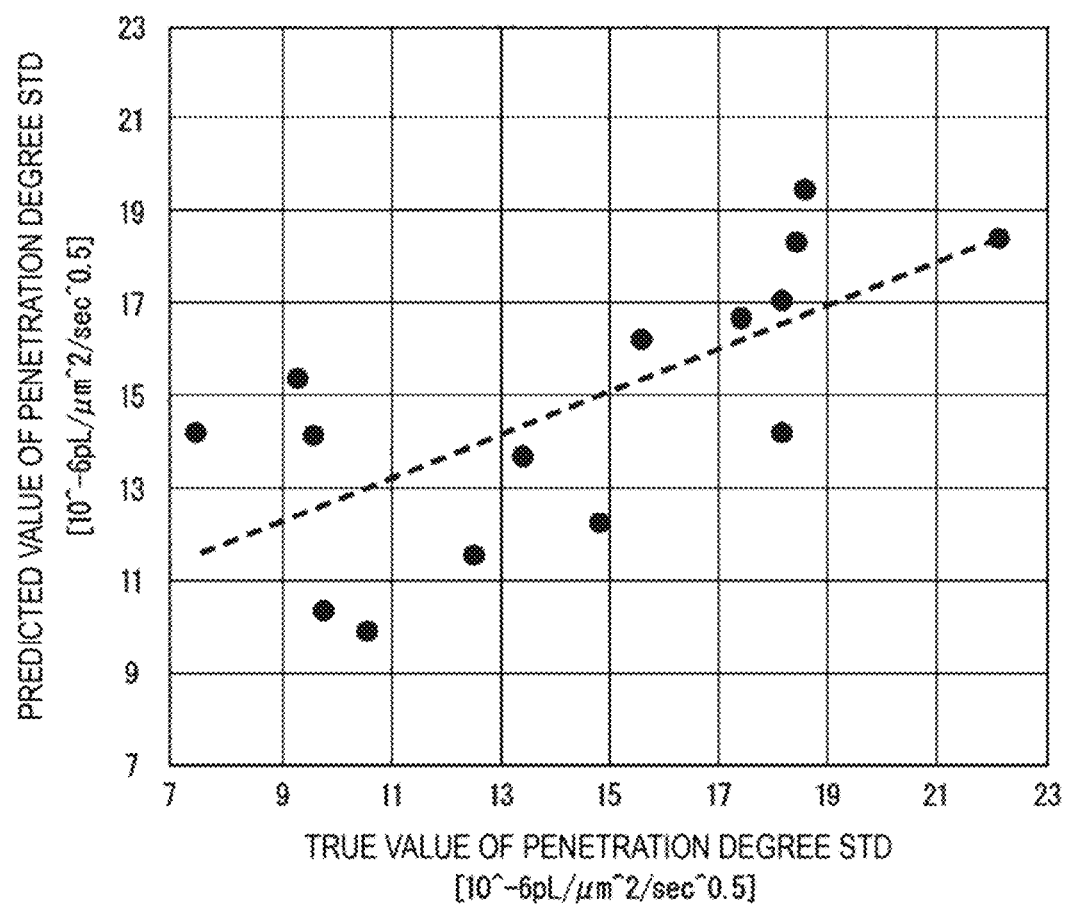
FIG. 15 shows a second relationship between the true value of the penetration degree STD and the predicted value according to the exemplary embodiment.

FIG. 15 shows a second relationship between the predicted value and the true value of the penetration degree STD according to the exemplary embodiment.

Figure 16:
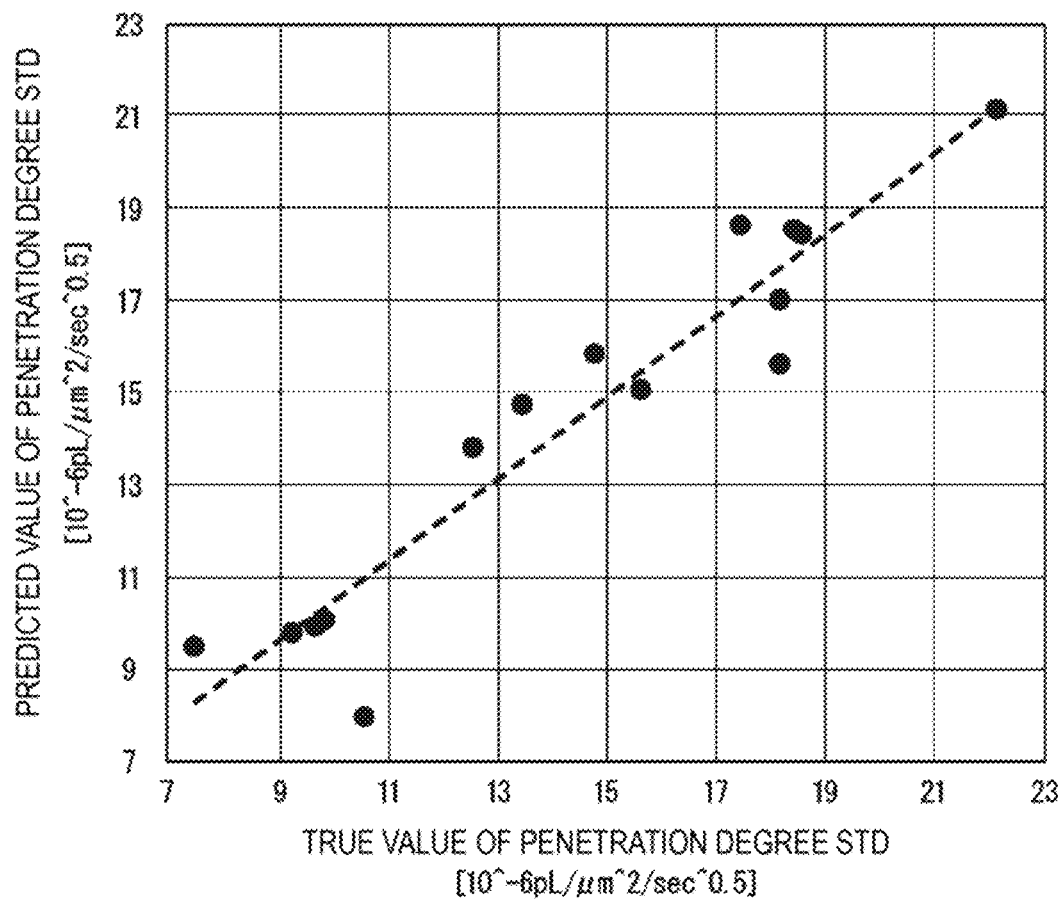
FIG. 16 shows a third relationship between the true value of the penetration degree STD and the predicted value according to the exemplary embodiment.

FIG. 16 shows a third relationship between the predicted value and the true value of the penetration degree STD according to the exemplary embodiment.

The "predicted value of the penetration degree STD" is a value of the penetration degree STD of the printing medium PM obtained by substituting one or more of the brightness statistic KT, the electrical resistance value DT, and the infrared absorption amounts SK1 and SK2 into the above penetration degree calculation equation EQ.

The "predicted value of the penetration degree STD" in FIG. 14 is a value of the penetration degree STD of the printing medium PM obtained by substituting only the brightness statistic KT into the above penetration degree calculation equation EQ.

The "predicted value of the penetration degree STD" in FIG. 15 is a value of the penetration degree STD of the printing medium PM obtained by substituting the electrical resistance value DT and the infrared absorption amounts SK1 and SK2 into the above penetration degree calculation equation EQ.

The "predicted value of the penetration degree STD" in FIG. 16 is a value of the penetration degree STD of the printing medium PM obtained by substituting the brightness statistic KT, the electrical resistance value DT, and the infrared absorption amounts SK1 and SK2 into the above penetration degree calculation equation EQ.

The "true value of the penetration degree STD" is, for example, the amount of movement (moving volume) of a droplet per unit time in the printing medium PM, which is obtained by imaging with a high resolution/high speed camera (for example, 0.1 to 0.5 μm/pixel, 10 to 20 μsec/frame).

In FIG. 14 to FIG. 16, the plotted points are points for plural sheets. The plural sheets are specified by parameters. The parameters are, for example, the type of the sheet and the brand of the sheet (manufacturing companies, factories).

The type of the sheet is, for example, gloss coated paper, matte coated paper, or the like. The brand of the sheet is a sheet manufacturing company (for example, a manufacturing company A, a manufacturing company B) and a sheet factory (for example, a factory a1 and a factory a2 owned by the sheet manufacturing company A).

For example, in FIG. 14 to FIG. 16, one sheet (plotted point) is, for example, gloss coated paper, and is shown to be manufactured in the factory a1 of the manufacturing company A. Another different sheet (plotted point) is, for example, gloss coated paper, and is shown to be manufactured in another factory a2 of the manufacturing company A. Yet another different sheet (plotted point) is, for example, gloss coated paper, and is shown to be manufactured in a factory b of the manufacturing company B.

As shown in FIG. 14 to FIG. 16, a straight line may be drawn under the method of least squares between the predicted value of the penetration degree STD and plural plotted points indicating the true value of the penetration degree STD. Therefore, it may be said that regardless of the type of the sheet and the brand of the sheet, there is a linear relationship between the true value of the penetration degree STD of the printing medium PM and the predicted value of the penetration degree STD of the printing medium PM.

In other words, it may be said that the predicted value of the penetration degree STD of the printing medium PM obtained by the above penetration degree calculation equation EQ is representative of the true value of the penetration degree STD of the printing medium PM and may be symbolized. That is, without obtaining the true value of the penetration degree STD of the printing medium PM under a large-scale and expensive environment using a laser microscope or the like, the penetration degree STD of the printing medium PM may be estimated by simply substituting the brightness statistic KT, the electrical resistance value DT, and the infrared absorption amounts SK1 and SK2 obtained under a small-scale and inexpensive environment, such as the white light emitting diode 31 and the CMOS sensor 32, into the above penetration degree calculation equation EQ.

Modification

Regarding the substitution into the penetration degree calculation equation EQ, for example, (1) the brightness statistic KT and the electrical resistance value DT may be substituted, (2) the brightness statistic KT and the infrared absorption amounts SK1 and SK2 may be substituted, (3) only the electrical resistance value DT may be substituted, or (4) only the infrared absorption amounts SK1 and SK2 may be substituted.

Supplementary Description of Processor and Program

In the embodiments above, the term "processor" refers to hardware in a broad sense. Examples of the processor includes general processors (e.g., CPU: Central Processing Unit), dedicated processors (e.g., GPU: Graphics Processing Unit, ASIC: Application Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

In the above exemplary embodiment, instead of being stored (installed) in the storage medium 14 in advance, the program PR may be provided by being recorded in a recording medium such as a compact disc read only memory (CD-ROM), a digital versatile disc read only memory (DVD-ROM), and a universal serial bus (USB) memory, or may be downloaded from an external device via a network.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
   a processor, wherein
   the processor is configured to
      acquire a first characteristic value indicating a shape characteristic of a surface of a medium,
      calculate, based on the first characteristic value, a penetration degree of a droplet into the medium based on a brightness statistic, as the first characteristic value, obtained from a diffused light amount image showing an amount of a light reflected by and diffused on the surface of the medium among lights incident on the surface of the medium, and
      calculate the brightness statistic by counting a number of a pixel indicating a possible pore, among a plurality of pixels within a unit area in the diffused light amount image, each of the plurality of pixels having a brightness value.

2. The information processing device according to claim 1, wherein
the pixel indicating a possible pore is a pixel having a brightness value at a position separated by a predetermined distance or longer from a most frequent brightness value in a distribution diagram. showing a relationship between the plurality of pixels and the brightness values.

3. The information processing device according to claim 1, wherein
the pixel indicating a possible pore includes a pixel having a brightness value equal to or greater than a predetermined first threshold value and a pixel having a brightness value equal to or smaller than a predetermined second threshold value.

4. The information processing device according to claim 1, wherein the processor is configured to
acquire a second characteristic value indicating a physical characteristic of the surface of the medium, and
calculate the penetration degree based on at least one of the first characteristic value and the second characteristic value.

5. The information processing device according to claim 2, wherein the processor is configured to
acquire a second characteristic value indicating a physical characteristic of the surface of the medium, and
calculate the penetration degree based on at least one of the first characteristic value and the second characteristic value.

6. The information processing device according to claim 3, wherein the processor is configured to
acquire a second characteristic value indicating a physical characteristic of the surface of the medium, and
calculate the penetration degree based on at least one of the first characteristic value and the second characteristic value.

7. The information processing device according to claim 4, wherein the processor is configured to
acquire, as the second characteristic value, an electrical resistance value on the surface of the medium.

8. The information processing device according to claim 4, wherein the processor is configured to
acquire, as the second characteristic value, an amount of an absorbed infrared light among an amount of infrared lights received by the surface of the medium.

9. The information processing device according to claim 4, wherein the processor is configured to
acquire, as the second characteristic value, both an electrical resistance value on the surface of the medium and an amount of an absorbed infrared light among an amount of infrared lights received by the surface of the medium.

10. A non-transitory computer readable medium storing a program causing a computer to execute a process for information processing, the process comprising:
acquiring a first characteristic value indicating a shape characteristic of a surface of a medium,
calculating, based on the first characteristic value, a penetration degree of a droplet into the medium based on a brightness statistic, as the first characteristic value, obtained from a diffused light amount image showing an amount of a light reflected by and diffused on the surface of the medium among lights incident on the surface of the medium and
calculating the brightness statistic by counting a number of a pixel indicating a possible pore, among a plurality of pixels within a unit area in the diffused light amount image, each of the plurality of pixels having a brightness value.

* * * * *